(12) United States Patent
Rayles

(10) Patent No.: US 12,456,495 B2
(45) Date of Patent: Oct. 28, 2025

(54) IDENTIFYING VIDEO SEGMENTS USING AUDIO SPECTROGRAMS

(71) Applicant: NBCUNIVERSAL MEDIA, LLC, Universal City, CA (US)

(72) Inventor: Jason Rayles, Brookline, MA (US)

(73) Assignee: NBCUNIVERSAL MEDIA, LLC, Universal City, CA (US)

( * ) Notice: Subject to any disclaimer, the term of this patent is extended or adjusted under 35 U.S.C. 154(b) by 140 days.

(21) Appl. No.: 18/452,134

(22) Filed: Aug. 18, 2023

(65) Prior Publication Data

US 2025/0061924 A1    Feb. 20, 2025

(51) Int. Cl.
  *G11B 27/34*    (2006.01)
  *G06F 18/22*    (2023.01)

(52) U.S. Cl.
  CPC ............... *G11B 27/34* (2013.01); *G06F 18/22* (2023.01)

(58) Field of Classification Search
  CPC ................................ G11B 27/34; G06F 18/22
  USPC .................................................. 386/241, 285
  See application file for complete search history.

(56) References Cited

U.S. PATENT DOCUMENTS

| 7,266,287 | B2 * | 9/2007 | Zhang | G11B 27/22 386/338 |
| 7,702,014 | B1 * | 4/2010 | Kellock | G11B 27/034 386/278 |
| 12,205,601 | B1 * | 1/2025 | McGuire | H04R 3/00 |
| 2014/0363138 | A1 * | 12/2014 | Coviello | H04N 21/4394 386/241 |
| 2016/0048723 | A1 * | 2/2016 | Jeong | G06F 18/22 382/197 |

* cited by examiner

*Primary Examiner* — Thai Q Tran
*Assistant Examiner* — Stephen R Smith
(74) *Attorney, Agent, or Firm* — LEE, HONG, DEGERMAN, KANG & WAIMEY

(57) ABSTRACT

According to at least one embodiment, a method of processing video includes: receiving content including a plurality of segments; and determining a terminus time of a segment of the plurality of segments based on an audio spectrogram associated with the content. The audio spectrogram includes pixels with brightness values over a plurality of frequencies along a first axis and over a plurality of timepoints along a second axis.

18 Claims, 7 Drawing Sheets

IDENTIFYING VIDEO SEGMENTS USING AUDIO SPECTROGRAMS

BACKGROUND

Video content such as a film or a television program may include video segments that, in turn, include individual frames. A beginning video segment(s) may carry bars and/or tones that are followed by slates providing the name of the program and an audio layout. The slates may be followed by main content, which is followed by a video segment(s) including textless frames. Textless frames may not have associated audio or text, and may be used to replace the corresponding frame in the main content, for example, when the video content is internationalized to one or more different countries and require a blank slate from a language perspective so that country-specific text may be inserted into the frame. Accordingly, original graphics including text in a base language (e.g., English) may be replaced by new graphics in the appropriate language.

Preparing content for final viewing may involve identifying one or more particular video segments. One or more segments may be identified by, for example, determining when each such segment begins and/or ends.

SUMMARY

Determining when a segment begins and/or ends may involve performing a frame-by-frame analysis (e.g., a frame-by-frame visual inspection). Such analysis may be a process that is manually performed by a human operator. When, for example, the number of frames in an individual segment and/or the number of segments is large, performing such a process may require a significant amount of time.

Aspects of the present disclosure are directed to identifying video segments more quickly. According to one or more aspects, identifying the beginning and/or end of a video segment in a piece of video content is performed by using audio spectrograms that represent audio content of the segment. Accordingly, identifying video segments can be performed more expeditiously. This enables content providers to make content available to various fulfillment pipelines more quickly and efficiently.

According to at least one embodiment, a method of processing video includes: receiving content including a plurality of segments; and determining a terminus time of a segment of the plurality of segments based on an audio spectrogram associated with the content. The audio spectrogram includes pixels with brightness values over a plurality of frequencies along a first axis and over a plurality of timepoints along a second axis.

According to at least one embodiment, a machine-readable non-transitory medium has stored thereon machine-executable instructions for processing video. The instructions include: receiving content including a plurality of segments; and determining a terminus time of a segment of the plurality of segments based on an audio spectrogram associated with the content. The audio spectrogram includes pixels with brightness values over a plurality of frequencies along a first axis and over a plurality of timepoints along a second axis.

According to at least one embodiment, an apparatus for processing video includes: a network communication unit configured to transmit and receive data; and one or more processors. The one or more processors are configured to: receive content including a plurality of segments; and determine a terminus time of a segment of the plurality of segments based on an audio spectrogram associated with the content. The audio spectrogram includes pixels with brightness values over a plurality of frequencies along a first axis and over a plurality of timepoints along a second axis.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

As described earlier, a human operator may manually perform a frame-by-frame analysis in determining when (e.g., at what point in time) a video segment begins and/or ends. Such determinations may be used to locate a particular portion(s) of the video content.

According to one or more aspects, the identification of the beginning and/or end of a video segment in a piece of video content is performed based on audio spectrograms that represent audio content of the segment. For example, such audio spectrograms may be used to determine estimates of a start time and/or end time of a particular segment. More broadly, this may be used, for example, to approximate when main content begins and/or ends.

Figure 5:
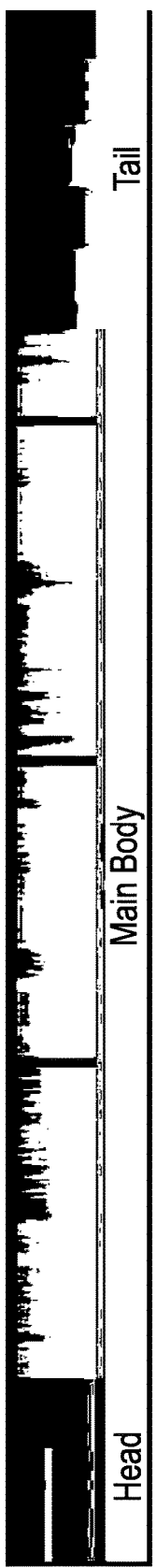
FIG. 5 illustrates an example spectrogram representing audio content that may be included in audiovisual content.

FIG. 5 illustrates an example spectrogram representing audio content that may be included in audiovisual content.

With reference to FIG. 5, the audiovisual content includes three segments. A first segment (e.g., the head) may carry bars and/or tones that are followed by slates providing the name of the program and an audio layout. A second segment (e.g., the main body) may carry main content that, for example, corresponds to the actual program. A third segment (e.g., the tail) may contain textless frames.

Figure 6:
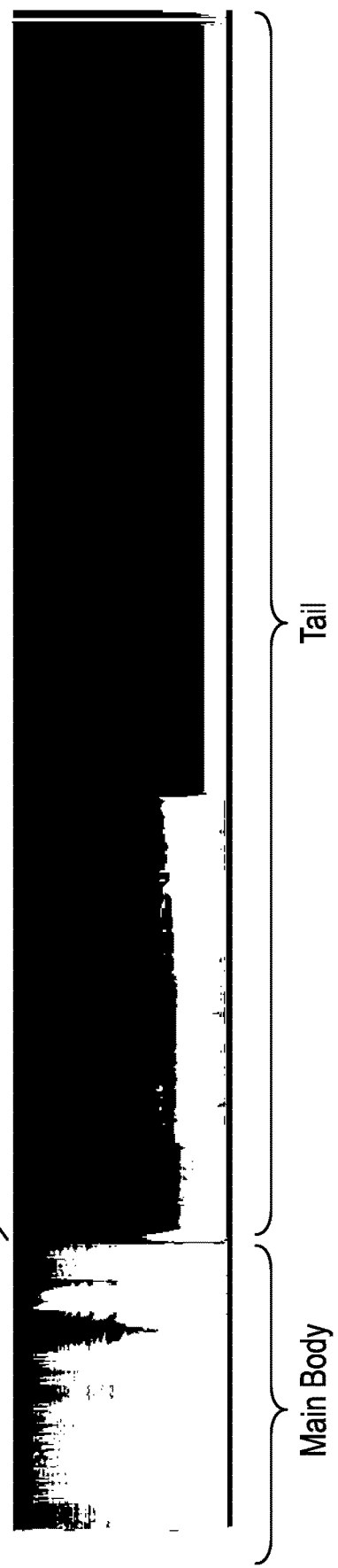
FIG. 6 illustrates a portion of the example spectrogram of FIG. 5.

FIG. 6 illustrates a portion of the example spectrogram of FIG. 5.

With reference to FIG. 6, adjacent portions of the second segment (e.g., the main body) and the third segment (e.g., the tail) are illustrated. According to one or more aspects, the identification of the beginning and/or end of a video segment (e.g., the main body) is performed based on audio spectrograms that represent audio content of the segment. For example, one or more estimates of the terminus time of the main body may be determined.

Figure 1A:
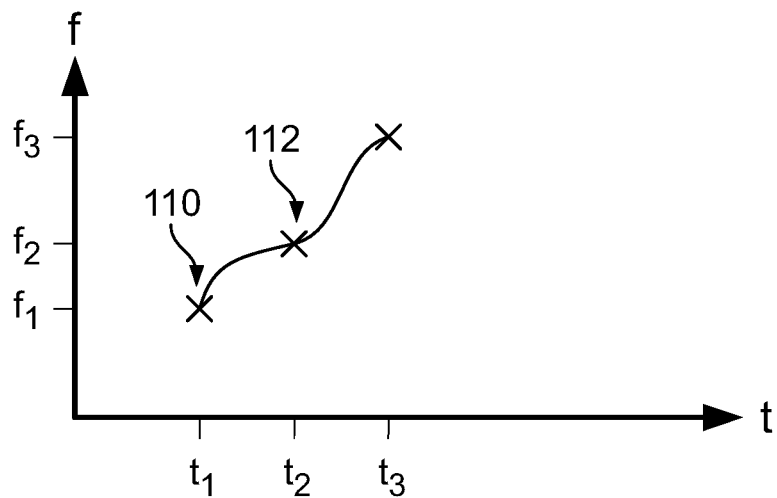
FIGS. 1(a), 1(b) and 1(c) illustrate example spectrograms simplified for purposes describing aspects and features of the present disclosure.
Figure 1B:
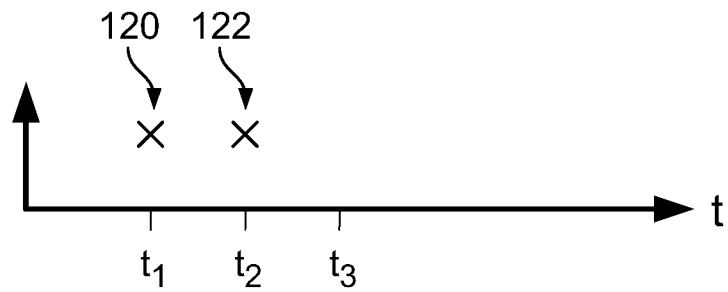
Figure 1C:
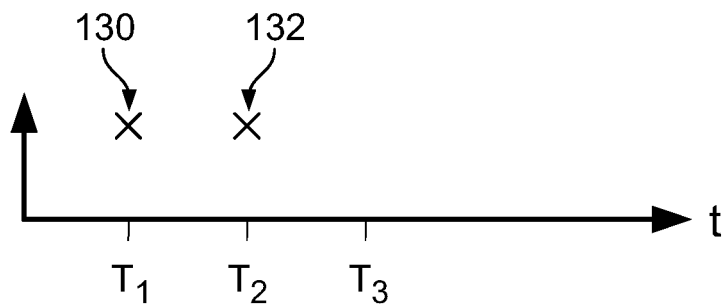

FIGS. 1(a), 1(b) and 1(c) illustrate example spectrograms simplified for purposes describing aspects and features of the present disclosure. Each spectrogram is a visual representation of the spectrum of frequencies (see vertical axis) in one or more channels of the audio content as the channel(s) varies over time (see horizontal axis).

With reference to FIG. 1(a), timepoints along the time axis may correspond to different frames of the audiovisual content. For example, a timepoint $t_1$ may correspond to a first frame of the audiovisual content. A timepoint $t_2$ may correspond to a second frame that is adjacent to (e.g., immediately follows) the first frame. Similarly, a timepoint $t_3$ may correspond to a time point of a third frame that is adjacent to the second frame.

The timepoints may be equally spaced from one another. For example, the underlying audiovisual content may have a frame rate of 30 frames per second. In such a situation, the separation between the timepoints $t_1$ and $t_2$ would be equal to 1/30-th of a second. Similarly, the separation between the timepoints $t_2$ and $t_3$ would also be equal to 1/30-th of a second.

With respect to the frequency axis, $f_1$, $f_2$, $f_3$ may correspond to different audio frequencies. A brightness (e.g., intensity or color) of a given pixel (or point) of the spectrogram indicates a power (or amplitude) of audio content with respect to a corresponding frequency and a corresponding time. For example, the brightness of pixel 110 indicates the power of the audio content with respect to the frequency $f_1$ at the time $t_1$. As another example, the brightness of pixel 112 indicates the power of the audio content with respect to the frequency $f_2$ at the time $t_2$.

According to one or more aspects, at least one axis of a spectrogram may be resized.

For example, FIG. 1(b) illustrates a resizing of the frequency axis of the spectrogram of FIG. 1(a). With reference to FIG. 1(b), brightness values with respect to a range of frequencies (e.g., across all frequencies in the spectrogram of FIG. 1(a)) at a particular timepoint are used to determine a single brightness value. For example, brightness values across a range of frequencies may be averaged to produce an average brightness value. With reference to FIG. 1(b), the brightness of pixel 120 indicates an average brightness value over a range of frequencies at the time $t_1$. As another example, the brightness of pixel 122 indicates an average brightness value over the range of frequencies at the time $t_2$. In such a manner, the frequency axis of the spectrogram of FIG. 1(a) is resized such that the resulting spectrogram (see FIG. 1(b)) has a height of 1 pixel.

Such resizing of the frequency axis may address the presence of audio that undesirably might be considered as substantive (or meaningful) audio content based on, for example, the volume level of such tones. For example, a portion of a video segment may include audio hiss or noise, but not any substantive audio content. As another example, a portion of a video segment may include random tones (e.g., a 1 kHz tone), but not any substantive audio content. If a volume of the audio hiss or the random tone meets a particular threshold, the portion of the video segment may be undesirably classified as including substantive audio content. Such a determination may lead to a conclusion that the portion of the video segment is not silent. This may be problematic if the presence of silence is considered indicative of a beginning and/or an end of a video segment.

Averaging brightness values across a range of frequencies to produce an average brightness value may reduce the influence of such audio. For example, an influence of the 1 kHz tone may be reduced, even if the tone meets or exceeds a particular volume threshold. The influence of the 1 kHz tone may be significantly reduced if, for example, the tone is not accompanied by other tone(s) at the relevant time. As such, resizing the frequency axis (see, e.g., FIG. 1(b)) may help to effectively mute (or filter out) an undue influence of the 1 kHz tone.

As described earlier, at least one axis of a spectrogram may be resized.

FIG. 1(c) illustrates a resizing of the time axis of the spectrogram of FIG. 1(b). The time axis may be resized such that a width of the spectrogram is resized (e.g., reduced) by a factor greater than 1. For ease of description, FIG. 1(c) will be described below with reference to width reduction by a factor of 100. However, it is understood that the width of the spectrogram may be reduced by a factor of a different value.

With reference to FIG. 1(c), $T_1$, $T_2$, $T_3$ may correspond to adjacent time points corresponding to different frames of the audiovisual content. As described earlier with reference to FIG. 1(a), the underlying audiovisual content may have a frame rate of 30 frames per second. In such a situation, the separation between adjacent timepoints $T_1$ and $T_2$ would be equal to 100/30 seconds. Similarly, the separation between adjacent timepoints $T_2$ and $T_3$ would also be equal to 100/30 seconds. As such, the width of the spectrogram of FIG. 1(c) is 1/100th of the width of the spectrogram of FIG. 1(b).

With continued reference to FIG. 1(c), the brightness of pixel 130 indicates an average brightness value over a range of frequencies at the time $T_1$. As another example, the brightness of pixel 132 indicates an average brightness value over the range of frequencies at the time $T_2$.

According to one or more aspects, a spectrogram may be used to estimate a timepoint at which a segment ends. For example, a spectrogram may be used in combination (or together) with a filter to estimate such a timepoint.

Figure 2:
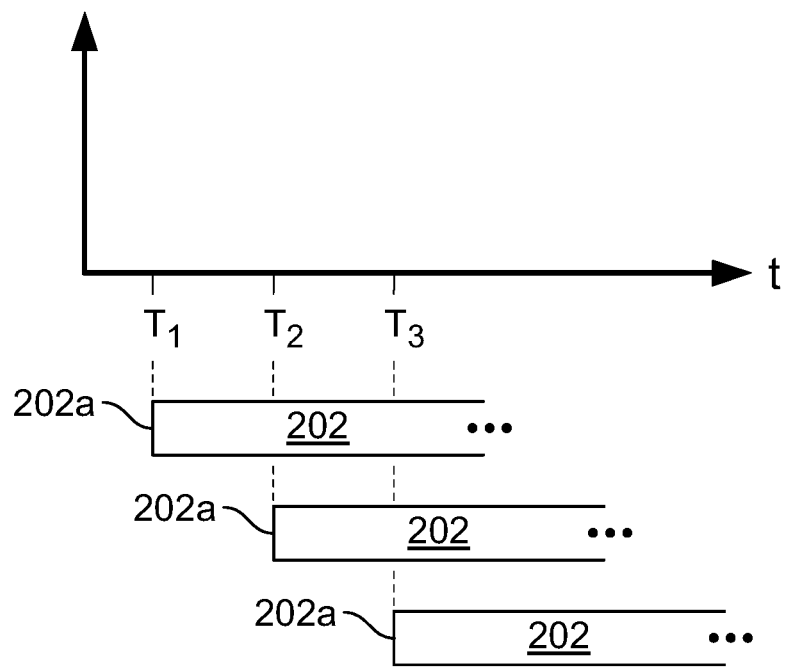
FIG. 2 illustrates using a filter in combination with the example spectrogram of FIG. 1(c), according to at least one embodiment.

FIG. 2 illustrates using a filter 202 in combination with the spectrogram of FIG. 1(c), according to at least one embodiment. According to one or more aspects, the filter 202 is formed to include a series of n binary components. For example, the filter 202 may include a 1-dimensional vector that includes a series of components each having a value of 1 (e.g., a series of 180 ones), followed by a series of components each having a value of 0 (e.g., a series of 90 zeros).

With reference to FIG. 2, a head end 202a of the filter 202 may be positioned to coincide (align) with the time point $T_1$. At this position, the filter 202 may be used to calculate a measure of similarity between the filter 202 and the average brightness values of the spectrogram that coincide with the filter relative to the time axis.

The filter 202 may next be re-positioned (e.g., slid along the time axis), such that the head end 202a of the filter 202 coincides with a different time point (e.g., adjacent time point $T_2$). At this subsequent position, the filter 202 may be used again to calculate a measure of similarity between the filter 202 and the average brightness values of the spectrogram that coincide with the filter relative to the time axis.

Similarly, the filter 202 may next be re-positioned, such that the head end 202a of the filter 202 coincides with a different time point (e.g., adjacent time point $T_3$). At this subsequent position, the filter 202 may be used again to calculate a measure of similarity between the filter 202 and the average brightness values of the spectrogram that coincide with the filter relative to the time axis.

The re-positioning of the filter 202 and the calculation of the measure of similarity may be repeated until the end of the content.

According to one or more aspects, calculating the measure of similarity includes calculating a cosine similarity. Alternatively (or in addition), calculating the measure of similarity may include calculating a Euclidean distance and/or a root mean squared error. Given two n-dimensional vectors A and B, the cosine similarity $\cos(\theta)$ is calculated using a dot product and magnitude as:

$$\text{cosine similarity} = S_C(A, B) := \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}},$$

where $A_i$ and $B_i$ denote the i-th component of vector A and the i-th component of vector B, respectively.

If the denominator of the above formulation of the cosine similarity is assigned a value of 0 (zero), computer errors may arise. According to one or more aspects, the spectrogram of FIG. 1(*c*) is padded to include small numbers at the head end and the tail end of the spectrogram. The specific values of such small numbers may not be critical. However, such small numbers may be included, e.g., to preempt the triggering of computing errors due to zero-value denominators.

Figure 3:
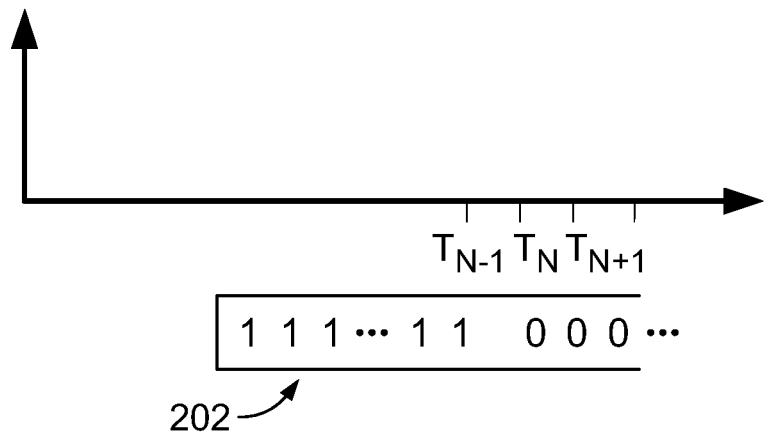
FIG. 3 illustrates selection of a timepoint for determining a first estimate, according to at least one embodiment.

The calculations described earlier with reference to FIG. 2 may be used to determine a first estimate (e.g., a coarse estimate) of an end time of a particular segment. For example, at a positioning of the filter 202 at which the largest cosine similarity is calculated, the timepoint that aligns with a first zero (i.e., most significant zero) in the filter is selected for determining the first estimate. By way of example, FIG. 3 illustrates a positioning of the filter 202 at which at which the largest cosine similarity is calculated. With reference to FIG. 3, the timepoint $T_N$ (which aligns with the most significant zero in the filter 202) is selected for determining the first estimate.

To determine the first estimate of the end time of the particular segment, the selected timepoint is multiplied by the factor by which the width of the spectrogram had been resized. For example, as described earlier with reference to FIGS. 1(*b*) and 1(*c*), the width of the spectrogram was reduced by a factor of 100. Therefore, the selected timepoint $T_N$ is multiplied by a factor of 100. The resulting product is the first estimate of the end time of the particular segment. As an example, if the selected timepoint corresponded to the 25 second mark, then multiplying by 100, would result in the first estimate of the end time being at the 2,500 second mark or the 50 minute and 50 second mark. Although the foregoing description provides that the width of the spectrogram is reduced by a factor of 100, the reduction can be by a different factor. For example, if the width of the spectrogram was reduced by a factor of X, then the selected timepoint $T_N$ is multiplied by a factor of X.

According to one or more aspects, a spectrogram may be used to produce a further estimate of the end time of the particular segment. For example, a spectrogram may be used in combination with a filter to produce such a further estimate. The further estimate may be more refined than the estimate described earlier with reference to FIGS. 2 and 3.

Figure 4:
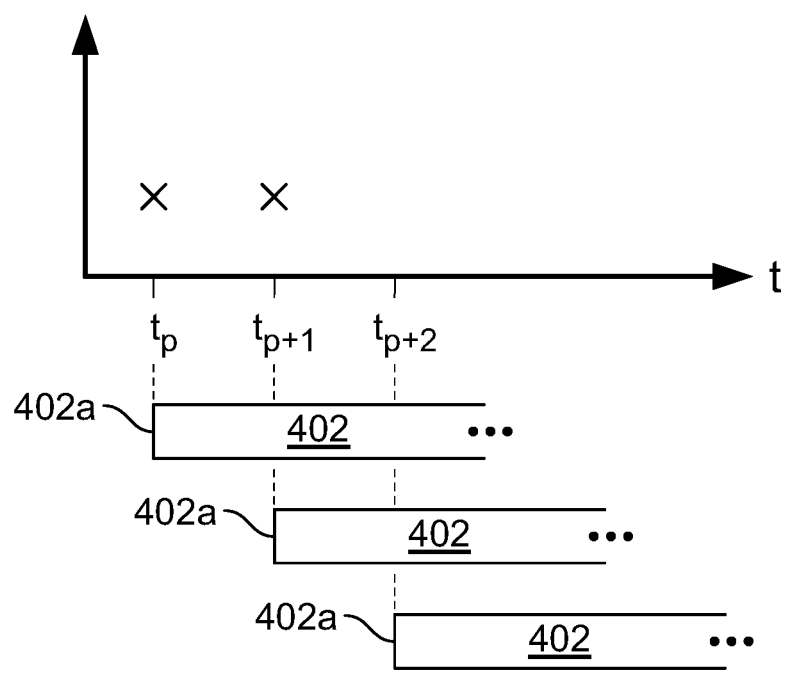
FIG. 4 illustrates using a filter in combination with the example spectrogram of FIG. 1(b) to produce a refined estimate, according to at least one embodiment.

For example, FIG. 4 illustrates using a filter 402 in combination with the spectrogram of FIG. 1(*b*) to produce a more refined estimate, according to at least one embodiment.

According to one or more aspects, the filter 402 is formed to include a series of m binary components. For example, the filter 402 may include a 1-dimensional vector that includes a series of components each having a value of 1 (e.g., a series of 18,000 ones), followed by a series of components each having a value of 0 (e.g., a series of 9,000 zeros). For example, as described earlier with reference to FIGS. 1(*b*) and 1(*c*), the width of the spectrogram was reduced by a factor of 100. Therefore, the filter 402 is formed to have a width that is equal to 100 times the width of the filter 202. As such, the filter 402 includes a series of m=100×n binary components.

In an example described earlier, the frame rate of the underlying audiovisual content may be 30 frames per second. In such a situation, the respective numbers of ones and zeros in the filter 402 (i.e., 18,000 and 9,000) represent a window that covers ten continuous minutes (i.e., 18,000 frames) of (potentially) high-volume audio followed by five continuous minutes (i.e., 9,000 frames) of (potentially) low-volume audio.

With reference to FIG. 4, a head end of the filter 402 may first be positioned to coincide (align) with a time point that is based on the first estimate that was described earlier with reference to FIGS. 2 and 3.

According to one or more aspects, the head end of the filter 402 may first be positioned to coincide with a time point that is equal to the first estimate, i.e., $T_N \times 100$.

According to one or more aspects, the head end of the filter 402 may first be positioned to coincide with a time point that is equal to the first estimate, i.e., $T_N \times 100$, minus a particular offset. The particular offset may be equal to a particular multiple of the separation between adjacent timepoints. For example, the particular offset may be equal to 200 times the separation between adjacent timepoints.

As was described earlier with reference to FIG. 1(*a*), the separation between the timepoints $t_1$ and $t_2$ is $\frac{1}{30}$-th of a second (e.g., the frame per second of the video content). Because the sizing of the time axis of the spectrogram of FIG. 1(*b*) matches the sizing of the time axis of the spectrogram of FIG. 1(*a*), the separation between adjacent timepoints in the spectrogram of FIG. 1(*b*) is also $\frac{1}{30}$-th of a second. Accordingly, the particular offset may be equal to 200/30 seconds.

With reference to FIG. 4, a head end 402*a* of the filter 402 may be positioned to coincide with the time point $t_p$, where $t_p = [(T_N \times 100) - 200/30]$ seconds (or different offset). At this position, the filter 402 may be used to calculate a measure of similarity (e.g., cosine similarity) between the filter 402 and the average brightness values of the spectrogram that coincide with the filter 402 relative to the time axis.

The filter 402 may next be re-positioned (e.g., slid or moved along the time axis), such that the head end 402*a* of the filter 402 coincides with a different time point (e.g., adjacent time point $t_{p+1}$). At this subsequent position, the filter 402 may be used again to calculate a measure of similarity (e.g., cosine similarity) between the filter 402 and the average brightness values of the spectrogram that coincide with the filter relative to the time axis.

Similarly, the filter 402 may next be re-positioned, such that the head end 402*a* of the filter 402 coincides with a different time point (e.g., adjacent time point $t_{p+2}$). At this subsequent position, the filter 402 may be used again to calculate a measure of similarity (e.g., cosine similarity) between the filter 402 and the average brightness values of the spectrogram that coincide with the filter relative to the time axis.

The re-positioning of the filter 402 and the calculation of the measure of similarity may be repeated until a time point that is equal to the first estimate, i.e., $T_N \times 100$, plus the particular offset.

The calculations described earlier with reference to FIG. 4 may be used to determine a second estimate (e.g., a refined estimate) of an end time of a particular segment. For example, similar to the timepoint selection described earlier with reference to FIG. 3, at a positioning of the filter 402 at which the largest cosine similarity is calculated, the timepoint that aligns with a first zero (i.e., most significant zero) in the filter is selected. According to one or more aspects, the selected timepoint is determined as the second estimate of the end time of the particular segment.

As has been described with reference to FIGS. 2, 3 and 4, an end time of a particular segment is estimated. It is understood that features similar to those described earlier with reference to FIGS. 2, 3 and 4 may be used to estimate a start time of a particular segment.

For example, a first estimate of a start time of a particular segment may be produced by using a filter in which the order, or sequence, of the components is reversed with respect to the filter 202 of FIG. 2. For example, such a filter may be formed to include a 1-dimensional vector that includes a series of components each having a value of 0 (e.g., a series of 90 zeroes), followed by a series of components each having a value of 1 (e.g., a series of 180 ones).

Similar to the sequence which was described earlier with reference to FIG. 2, as the filter is positioned and repositioned, the filter described above may be used to calculate a measure of similarity (e.g., cosine similarity) between the filter and the brightness values of the spectrogram. At a positioning of the filter at which the largest cosine similarity is calculated, the timepoint that aligns with a first '1' (i.e., most significant '1') in the filter is selected.

Similarly, a second estimate of the start time of the particular segment may be produced by using a filter in which the polarity of the components is reversed with respect to the filter 402 of FIG. 4. For example, such a filter may be formed to include a 1-dimensional vector that includes a series of components each having a value of 0 (e.g., a series of 9,000 zeroes), followed by a series of components each having a value of 1 (e.g., a series of 18,000 ones).

Similar to the sequence which was described earlier with reference to FIG. 2, as the filter is positioned and repositioned, the filter may be used to calculate a measure of similarity (e.g., cosine similarity) between the filter and the brightness values of the spectrogram. At a positioning of the filter at which the largest cosine similarity is calculated, the timepoint that aligns with a first '1' (i.e., most significant '1') in the filter is selected.

Figure 7:
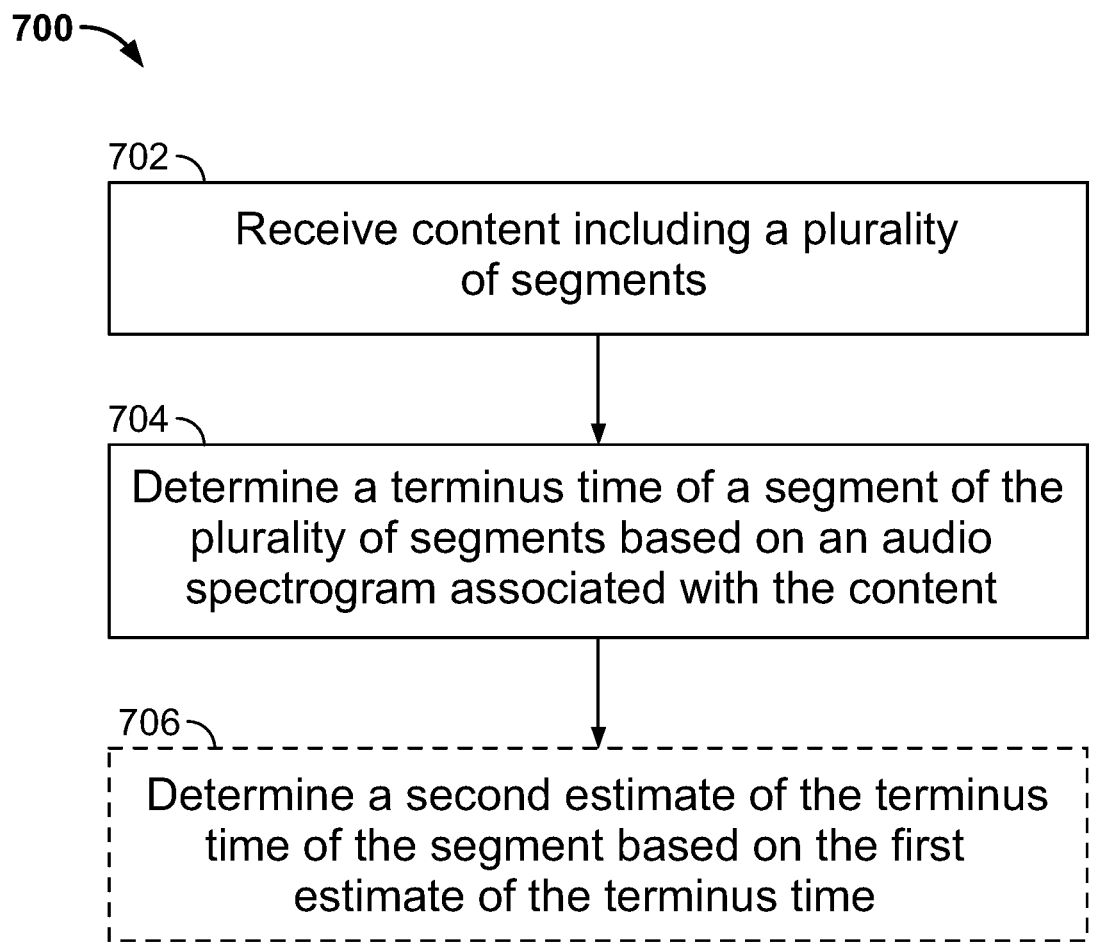
FIG. 7 illustrates a flowchart of processing video according to at least one embodiment.

FIG. 7 illustrates a flowchart of a method 700 of processing video according to at least one embodiment.

At block 702, content including a plurality of segments is received. For example, as described earlier with reference to FIG. 5, content including three segments (e.g., the head, the main body and the tail) may be received.

At block 704, a terminus time of a segment of the plurality of segments is determined based on an audio spectrogram associated with the content. The audio spectrogram includes pixels with brightness values over a plurality of frequencies along a first axis and over a plurality of timepoints along a second axis.

For example, as described earlier with reference to FIG. 6, the identification of the beginning and/or end of a video segment (e.g., the main body) is performed.

According to at least one further aspect, determining the terminus time of the segment may include determining a first estimate of the terminus time. The first estimate is determined by resizing the audio spectrogram (see, e.g., FIG. 1(*b*)) such that, for each timepoint of the plurality of timepoints, a single brightness value is generated to represent corresponding brightness values at each timepoint. For a subset of timepoints of the resized audio spectrogram: a filter (see, e.g., filter 202 of FIG. 2) is positioned with respect to the resized audio spectrogram such that a head of the filter aligns with a first timepoint of the subset of timepoints, wherein the filter includes values and is associated with a window size; and a measure of similarity is calculated, wherein the measure of similarity is between the values of the filter and the single brightness values corresponding to the first timepoint through a second timepoint as determined based on the window size. The first estimate is determined as corresponding to a timepoint of the subset at which the greatest measure of similarity is calculated.

According to at least one further aspect, the plurality of timepoints are equally spaced apart from each other along the second axis, and the spacing corresponds to a frame rate of the content.

According to at least one further aspect, in the resizing of the audio spectrogram, the second axis of the audio spectrogram is reduced by an integer factor (see, e.g., FIG. 1(*c*)), and the subset of timepoints corresponds to a resized subset of timepoints corresponding to the resized audio spectrogram.

According to at least one further aspect, determining the first estimate as corresponding to the timepoint of the subset at which the greatest measure of similarity is calculated includes selecting a timepoint that aligns with a position of a most significant 0 in the filter (see, e.g., FIG. 3).

According to at least one further aspect, calculating the measure of similarity includes calculating a cosine similarity between the values of the filter and the single brightness values corresponding to the first timepoint through the second timepoint as determined based on the window size.

According to at least one further aspect, the method 700 further includes determining a second estimate of the terminus time of the segment based on the first estimate of the terminus time.

For example, as described earlier with reference to FIG. 4, a filter 402 may be used in combination with the spectrogram of FIG. 1(*b*) to produce a more refined estimate.

According to at least one further aspect, determining the second estimate includes: for a second subset of timepoints of the plurality of timepoints of the resized audio spectrogram: positioning a second filter such that a second head of the second filter aligns with a third timepoint of the second subset of timepoints (see, e.g., FIG. 4), wherein the second filter includes value and is associated with a second window size; and calculating a second measure of similarity between the values of the second filter and the single brightness values corresponding to the third timepoint through a fourth timepoint as determined based on the second window size. Determining the second estimate further includes determining the second estimate as corresponding to a timepoint of the second subset at which a greatest second measure of similarity is calculated.

According to at least one further aspect, a width of the second window size is equal to a width of the window size multiplied by an integer factor.

According to at least one further aspect, the first estimate of the terminus time of the segment is associated with an end time of the segment, and the filter includes a one-dimensional vector including a first plurality of binary components each having a value of 1 followed by a second plurality of binary components each having a value of 0.

According to at least one further aspect, the first estimate of the terminus time of the segment is associated with a start time of the segment, and the filter includes a one-dimensional vector including a first plurality of binary components each having a value of 0 followed by a second plurality of binary components each having a value of 1.

In at least some embodiments, features described herein, or other aspects of the disclosure (e.g., the method 700 of FIG. 7) may be implemented and/or performed at one or more software or hardware computer systems which may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

The components of various embodiments described herein may each include a hardware processor of the one or more computer systems, and, in one embodiment, a single processor may be configured to implement the various components. For example, in one embodiment, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 8:
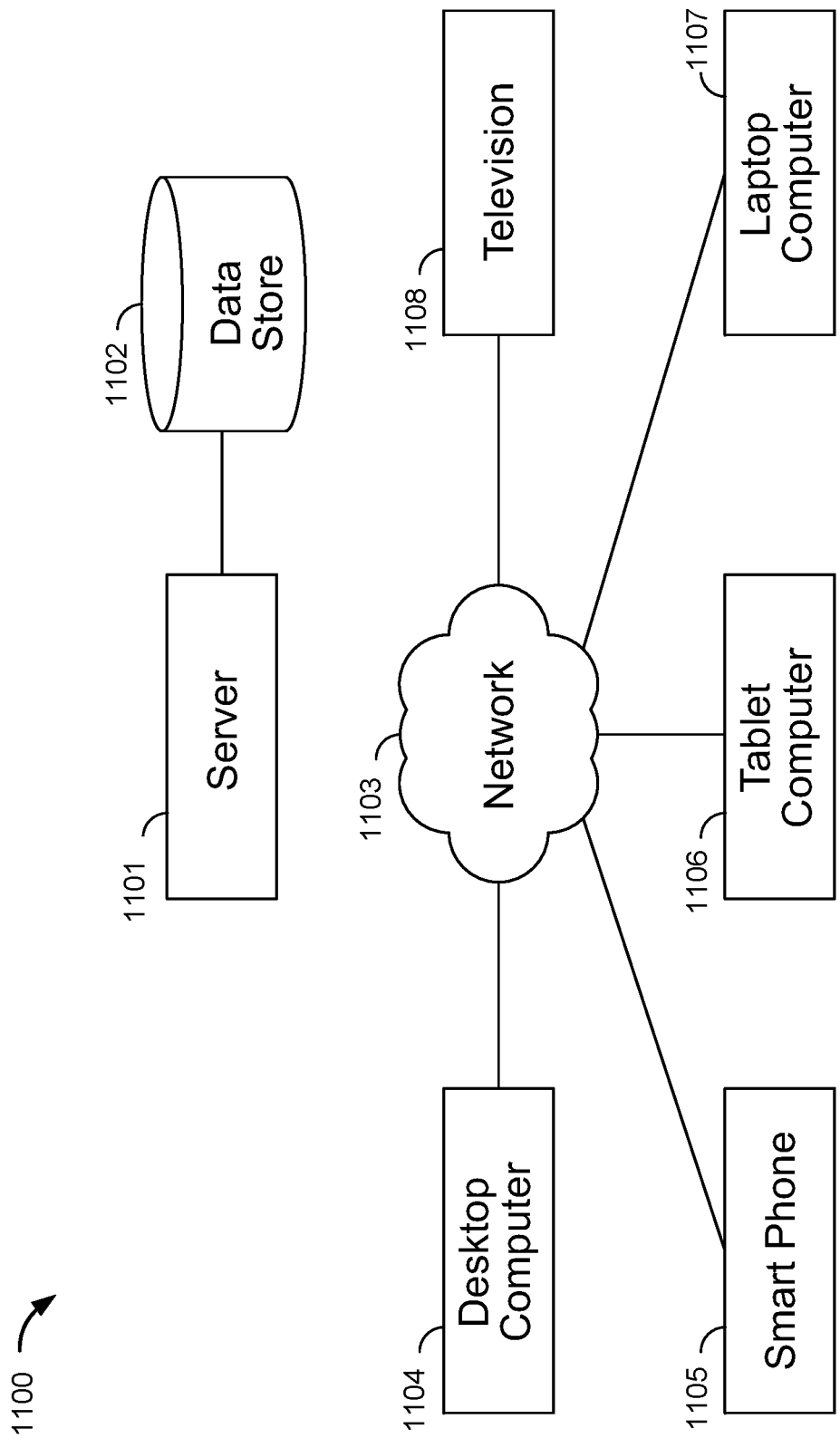
FIG. 8 is an illustration of a computing environment according to at least one embodiment.

In selected embodiments, features and aspects described herein may be implemented within a computing environment 1100, as shown in FIG. 8, which may include one or more computer servers 1101. The server 1101 may be operatively coupled to one or more data stores 1102 (for example, databases, indexes, files, or other data structures). The server 1101 may connect to a data communication network 1103 including a local area network (LAN), a wide area network (WAN) (for example, the Internet), a telephone network, a satellite or wireless communication network, or some combination of these or similar networks.

One or more client devices 1104, 1105, 1106, 1107, 1108 may be in communication with the server 1101, and a corresponding data store 1102 via the data communication network 1103. Such client devices 1104, 1105, 1106, 1107, 1108 may include, for example, one or more laptop computers 1107, desktop computers 1104, smartphones and mobile phones 1105, tablet computers 1106, televisions 1108, or combinations thereof. In operation, such client devices 1104, 1105, 1106, 1107, 1108 may send and receive data or instructions to or from the server 1101 in response to user input received from user input devices or other input. In response, the server 1101 may serve data from the data store 1102, alter data within the data store 1102, add data to the data store 1102, or the like, or combinations thereof.

In selected embodiments, the server 1101 may transmit one or more media files including audio and/or video content, encoded data, generated data, and/or metadata from the data store 1102 to one or more of the client devices 1104, 1105, 1106, 1107, 1108 via the data communication network 1103. The devices may output the audio and/or video content from the media file using a display screen, projector, or other display output device. In certain embodiments, the environment 1100 configured in accordance with features and aspects described herein may be configured to operate within or support a cloud computing environment. For example, a portion of, or all of, the data store 1102 and server 1101 may reside in a cloud server.

Figure 9:
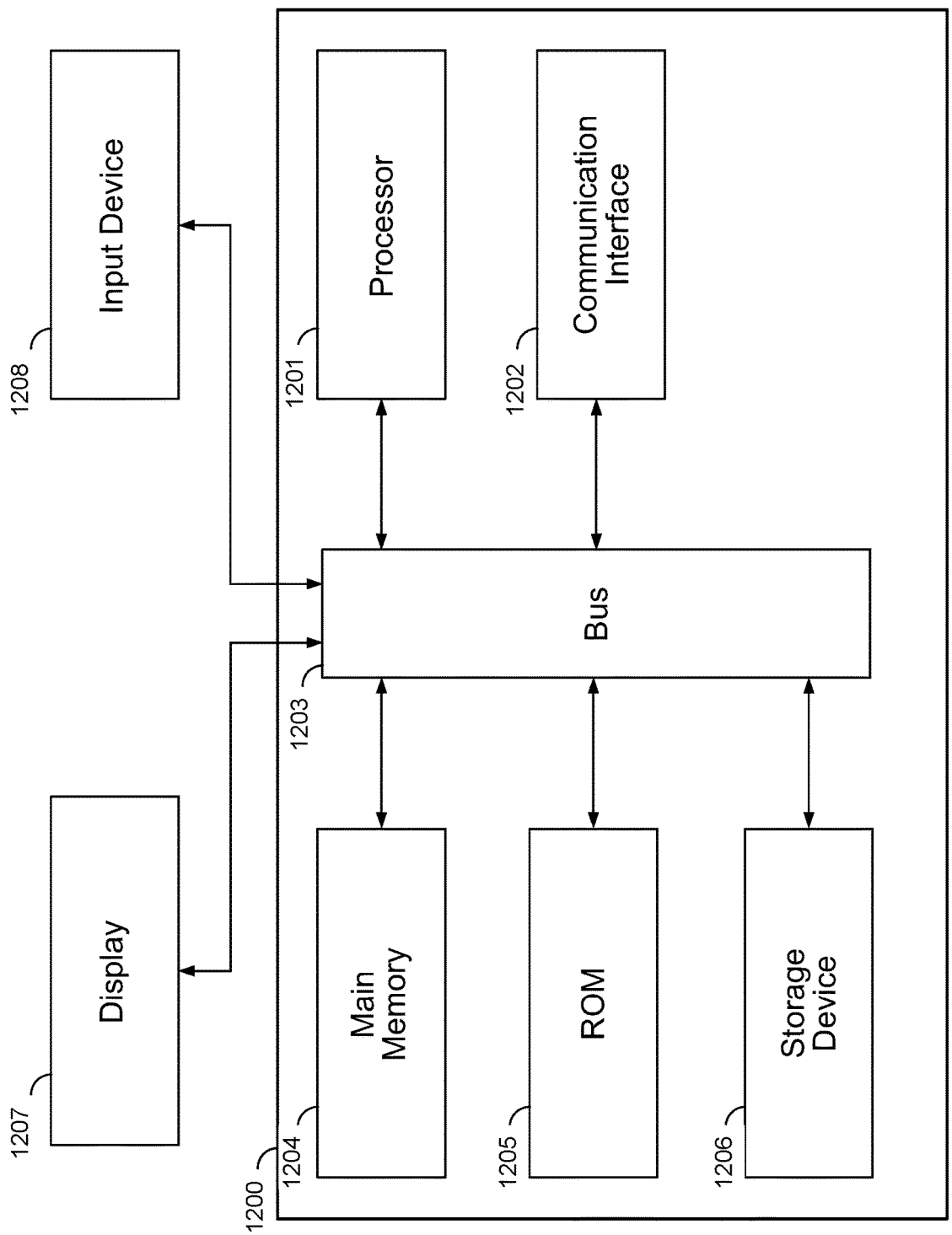
FIG. 9 is a block diagram of a device according to at least one embodiment.

With reference to FIG. 9, an illustration of an example computer 1200 is provided. One or more of the devices 1104, 1105, 1106, 1107, 1108 of the environment 1100 may be configured as or include such a computer 1200.

In selected embodiments, the computer 1200 may include a bus 1203 (or multiple buses) or other communication mechanism, a processor 1201, main memory 1204, read only memory (ROM) 1205, one or more additional storage devices 1206, and/or a communication interface 1202, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 1203 or other communication mechanism, including multiple such buses or mechanisms, may support communication of information within the computer 1200. The processor 1201 may be connected to the bus 1203 and process information. In selected embodiments, the processor 1201 may be a specialized or dedicated microprocessor configured to perform particular tasks in accordance with the features and aspects described herein by executing machine-readable software code defining the particular tasks. Main memory 1204 (for example, random access memory—or RAM—or other dynamic storage device) may be connected to the bus 1203 and store information and instructions to be executed by the processor 1201. Main memory 1204 may also store temporary variables or other intermediate information during execution of such instructions.

ROM 1205 or some other static storage device may be connected to a bus 1203 and store static information and instructions for the processor 1201. The additional storage device 1206 (for example, a magnetic disk, optical disk, memory card, or the like) may be connected to the bus 1203. The main memory 1204, ROM 1205, and the additional storage device 1206 may include a non-transitory computer-readable medium holding information, instructions, or some combination thereof—for example, instructions that, when executed by the processor 1201, cause the computer 1200 to perform one or more operations of a method as described herein. The communication interface 1202 may also be connected to the bus 1203. A communication interface 1202 may provide or support two-way data communication between the computer 1200 and one or more external devices (for example, other devices contained within the computing environment).

In selected embodiments, the computer 1200 may be connected (for example, via the bus 1203) to a display 1207. The display 1207 may use any suitable mechanism to communicate information to a user of a computer 1200. For example, the display 1207 may include or utilize a liquid crystal display (LCD), light emitting diode (LED) display, projector, or other display device to present information to a user of the computer 1200 in a visual display. One or more input devices 1208 (for example, an alphanumeric keyboard, mouse, microphone) may be connected to the bus 1203 to communicate information and commands to the computer 1200. In selected embodiments, one input device 1208 may provide or support control over the positioning of a cursor to allow for selection and execution of various objects, files, programs, and the like provided by the computer 1200 and displayed by the display 1207.

The computer 1200 may be used to transmit, receive, decode, display, etc. one or more video files. In selected embodiments, such transmitting, receiving, decoding, and displaying may be in response to the processor 1201 executing one or more sequences of one or more instructions contained in main memory 1204. Such instructions may be read into main memory 1204 from another non-transitory computer-readable medium (for example, a storage device).

Execution of sequences of instructions contained in main memory 1204 may cause the processor 1201 to perform one or more of the procedures or steps described herein. In selected embodiments, one or more processors in a multi-processing arrangement may also be employed to execute sequences of instructions contained in main memory 1204. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 1201, or that stores data for processing by a computer, and include all computer-readable media, with the sole exception being a transitory, propagating signal. Such a non-transitory computer readable medium may include, but is not limited to, non-volatile media, volatile media, and temporary storage media (for example, cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 1202 may provide or support external, two-way data communication to or via a network link. For example, the communication interface 1202 may be a wireless network interface controller or a cellular radio providing a data communication network connection. Alternatively, the communication interface 1202 may include a LAN card providing a data communication connection to a compatible LAN. In any such embodiment, the communication interface 1202 may send and receive electrical, electromagnetic, or optical signals conveying information.

A network link may provide data communication through one or more networks to other data devices (for example, client devices as shown in the computing environment 1100). For example, a network link may provide a connection through a local network of a host computer or to data equipment operated by an Internet Service Provider (ISP). An ISP may, in turn, provide data communication services through the Internet. Accordingly, a computer 1200 may send and receive commands, data, or combinations thereof, including program code, through one or more networks, a network link, and communication interface 1202. Thus, the computer 1200 may interface or otherwise communicate with a remote server (for example, server 1101), or some combination thereof.

The various devices, modules, terminals, and the like described herein may be implemented on a computer by execution of software including machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of processing video, the method comprising:
receiving content comprising a plurality of segments; and
determining a terminus time of a segment of the plurality of segments based on an audio spectrogram associated with the content, the audio spectrogram comprising pixels with brightness values over a plurality of frequencies along a first axis and over a plurality of timepoints along a second axis,
wherein determining the terminus time of the segment comprises:
determining a first estimate of the terminus time by:
resizing the audio spectrogram such that, for each timepoint of the plurality of timepoints, a single brightness value is generated to represent corresponding brightness values at each timepoint;
for a subset of timepoints of the resized audio spectrogram:
positioning a filter with respect to the resized audio spectrogram such that a head of the filter aligns with a first timepoint of the subset of timepoints, wherein the filter comprises values and is associated with a window size; and
calculating a measure of similarity between the values of the filter and the single brightness values corresponding to the first timepoint through a second timepoint as determined based on the window size; and determining the first estimate as corresponding to a timepoint of the subset at which a greatest measure of similarity is calculated.

2. The method of claim 1, wherein the plurality of timepoints are equally spaced apart from each other along the second axis, and the spacing corresponds to a frame rate of the content.

3. The method of claim 1, wherein, in the resizing of the audio spectrogram, the second axis of the audio spectrogram is reduced by an integer factor, and wherein the subset of timepoints corresponds to a resized subset of timepoints corresponding to the resized audio spectrogram.

4. The method of claim 1, wherein determining the first estimate as corresponding to the timepoint of the subset at which the greatest measure of similarity is calculated comprises selecting a timepoint that aligns with a position of a most significant 0 in the filter.

5. The method of claim 1, wherein calculating the measure of similarity comprises calculating a cosine similarity between the values of the filter and the single brightness values corresponding to the first timepoint through the second timepoint as determined based on the window size.

6. The method of claim 1, further comprising determining a second estimate of the terminus time of the segment based on the first estimate of the terminus time.

7. The method of claim 6, wherein determining the second estimate comprises:
for a second subset of timepoints of the plurality of timepoints of the resized audio spectrogram:
positioning a second filter such that a second head of the second filter aligns with a third timepoint of the second subset of timepoints, wherein the second filter comprises values and is associated with a second window size; and
calculating a second measure of similarity between the values of the second filter and the single brightness values corresponding to the third timepoint through a fourth timepoint as determined based on the second window size; and
determining the second estimate as corresponding to a timepoint of the second subset at which a greatest second measure of similarity is calculated.

8. The method of claim 7, wherein a width of the second window size is equal to a width of the window size multiplied by an integer factor.

9. The method of claim 1, wherein:
the first estimate of the terminus time of the segment is associated with an end time of the segment; and
the filter comprises a one-dimensional vector comprising a first plurality of binary components each having a value of 1 followed by a second plurality of binary components each having a value of 0.

10. The method of claim 1, wherein:
the first estimate of the terminus time of the segment is associated with a start time of the segment; and
the filter comprises a one-dimensional vector comprising a first plurality of binary components each having a value of 0 followed by a second plurality of binary components each having a value of 1.

11. A machine-readable non-transitory medium having stored thereon machine-executable code for processing video, comprising code to:
receive content comprising a plurality of segments; and
determine a terminus time of a segment of the plurality of segments based on an audio spectrogram associated with the content, the audio spectrogram comprising pixels with brightness values over a plurality of frequencies along a first axis and over a plurality of timepoints along a second axis,
wherein code to determine the terminus time of the segment comprises code to:
determine a first estimate of the terminus time by:
resizing the audio spectrogram such that, for each timepoint of the plurality of timepoints, a single brightness value is generated to represent corresponding brightness values at each timepoint;
for a subset of timepoints of the resized audio spectrogram:
positioning a filter with respect to the resized audio spectrogram such that a head of the filter aligns with a first timepoint of the subset of timepoints, wherein the filter comprises values and is associated with a window size; and
calculating a measure of similarity between the values of the filter and the single brightness values corresponding to the first timepoint through a second timepoint as determined based on the window size; and
determining the first estimate as corresponding to a timepoint of the subset at which a greatest measure of similarity is calculated.

12. The machine-readable non-transitory medium of claim 11, wherein the plurality of timepoints are equally spaced apart from each other along the second axis, and the spacing corresponds to a frame rate of the content.

13. The machine-readable non-transitory medium of claim 11, wherein, in the resizing of the audio spectrogram, the second axis of the audio spectrogram is reduced by an integer factor, and wherein the subset of timepoints corresponds to a resized subset of timepoints corresponding to the resized audio spectrogram.

14. The machine-readable non-transitory medium of claim 11, wherein the code to determine the first estimate as corresponding to the timepoint of the subset at which the greatest measure of similarity is calculated comprises code to select a timepoint that aligns with a position of a most significant 0 in the filter.

15. The machine-readable non-transitory medium of claim 11, wherein code to calculate the measure of similarity comprises code to calculate a cosine similarity between the values of the filter and the single brightness values corresponding to the first timepoint through the second timepoint as determined based on the window size.

16. The machine-readable non-transitory medium of claim 11, further comprising code to determine a second estimate of the terminus time of the segment based on the first estimate of the terminus time.

17. The machine-readable non-transitory medium of claim 16, wherein the code to determine the second estimate comprises code to:
for a second subset of timepoints of the plurality of timepoints of the resized audio spectrogram:
position a second filter such that a second head of the second filter aligns with a third timepoint of the second subset of timepoints, wherein the second filter comprises value and is associated with a second window size; and
calculate a second measure of similarity between the values of the second filter and the single brightness values corresponding to the third timepoint through a fourth timepoint as determined based on the second window size; and determine the second estimate as corresponding to a timepoint of the second subset at which a greatest second measure of similarity is calculated.

18. An apparatus for processing video, the apparatus comprising:

a network communication unit configured to transmit and receive data; and one or more processors configured to:

receive content comprising a plurality of segments; and determine a terminus time of a segment of the plurality of segments based on an audio spectrogram associated with the content, the audio spectrogram comprising pixels with brightness values over a plurality of frequencies along a first axis and over a plurality of timepoints along a second axis, wherein the one or more processors are further configured to determine the terminus time of the segment by:

determining a first estimate of the terminus time by:

resizing the audio spectrogram such that, for each timepoint of the plurality of timepoints, a single brightness value is generated to represent corresponding brightness values at each timepoint;

for a subset of timepoints of the resized audio spectrogram:

positioning a filter with respect to the resized audio spectrogram such that a head of the filter aligns with a first timepoint of the subset of timepoints, wherein the filter comprises values and is associated with a window size; and calculating a measure of similarity between the values of the filter and the single brightness values corresponding to the first timepoint through a second timepoint as determined based on the window size; and determining the first estimate as corresponding to a timepoint of the subset at which a greatest measure of similarity is calculated.

* * * * *